UNITED STATES PATENT OFFICE.

JACOB F. AUSENHEIMER, OF CINCINNATI, OHIO, ASSIGNOR OF ONE-HALF TO GEORGE R. MESSMER.

COMPOUND FOR PITCHING PACKAGES.

SPECIFICATION forming part of Letters Patent No. 601,611, dated March 29, 1898.

Application filed June 18, 1897. Serial No. 641,399. (No specimens.)

*To all whom it may concern:*

Be it known that I, JACOB F. AUSENHEIMER, a citizen of the United States, residing in the city of Cincinnati, county of Hamilton, and State of Ohio, have invented a new and useful Compound for Pitching Packages, of which the following is a specification.

My composition consists of the following ingredients combined in about the proportions hereinafter stated.

In the first place I make a mixture consisting of the following ingredients in about the proportions named—to wit, paraffin, seventy per cent.; brewers' pitch, twenty per cent.; beeswax, five per cent.; glycerin, two per cent.; alcohol, two per cent.; burnt sugar, one per cent. The brewers' pitch herein used and referred to is composed of rosin and rosin-oil. In five hundred pounds of brewers' pitch between ten and fifteen gallons would be rosin-oil and the balance rosin. Sometimes a little tallow or linseed-oil is used, but not always. These ingredients are to be thoroughly mixed by agitation, preferably as follows, to wit: The paraffin, brewers' pitch, and beeswax are boiled or heated in a kettle, or in some preferable manner, until the heat attains about 200° Fahrenheit. The glycerin, alcohol, and burnt sugar are then added, the burnt sugar being preferably added in a liquid form.

In the second place I take about five hundred pounds of brewers' pitch and boil or heat to about 300° Fahrenheit, adding one and one-half pounds of the product first above described, composed of paraffin, brewers' pitch, beeswax, glycerin, alcohol, and burnt sugar prepared as described. This makes about five hundred pounds of my new and useful composition of matter or pitch.

Of course these proportions can be varied, and ingredients producing the same results can be substituted for the ones herein specifically set forth.

By the use of my new and useful composition packages can be properly pitched, the composition filling up all worm-holes, crevises, open grain in the wood, and all seed-holes. It flows readily and thus prevents a lumpy or irregular formation. It lasts longer, will not crack or chip off, and preserves beer in its natural brew, as it will preserve any other liquids placed in pitched packages. It will not become hard by the use of high temperature in the process of pitching the packages.

What I claim, and desire to secure by Letters Patent of the United States, is—

The herein-described compound for pitching packages, consisting of paraffin, brewers' pitch, beeswax, glycerin, alcohol and burnt sugar, in about the proportions specified.

JACOB F. AUSENHEIMER.

Witnesses:
R. H. IZOR,
G. H. RICKE.